(12) United States Patent
Hammond

(10) Patent No.: US 6,910,081 B1
(45) Date of Patent: Jun. 21, 2005

(54) APPARATUS AND METHOD FOR PROVIDING SERVICES USING PERSONAL ADDRESS BOOKS

(75) Inventor: Robert W. Hammond, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 603 days.

(21) Appl. No.: 09/712,554

(22) Filed: Nov. 14, 2000

(51) Int. Cl.[7] .............................................. G06F 15/16
(52) U.S. Cl. ........................ 709/245; 709/245; 709/204
(58) Field of Search ................................ 709/200, 203, 709/204, 205, 206, 207, 217–219, 245, 248

(56) References Cited

U.S. PATENT DOCUMENTS

| | | | | | |
|---|---|---|---|---|---|
| 6,016,478 | A | * | 1/2000 | Zhang et al. .................... | 705/9 |
| 6,487,583 | B1 | * | 11/2002 | Harvey et al. ............... | 709/204 |
| 6,564,261 | B1 | * | 5/2003 | Gudjonsson et al. ....... | 709/227 |
| 6,574,599 | B1 | * | 6/2003 | Lim et al. .................... | 704/270 |
| 6,587,547 | B1 | * | 7/2003 | Zirngibl et al. ........... | 379/88.17 |
| 6,606,596 | B1 | * | 8/2003 | Zirngibl et al. ............. | 704/270 |
| 2001/0049637 | A1 | * | 12/2001 | Tso .............................. | 705/26 |

OTHER PUBLICATIONS

"Viral Marketing" by Steve Jurvetson and Tim Draper., Published in Business 2.0, Nov. 1998 (pp. 1–7).*
Creating Super–Magnetic Communities At Internet Speed, Interactive Metro (date unknown).*
Homestead,www.homestead.com (unknown).*

* cited by examiner

Primary Examiner—Glenton B. Burgess
Assistant Examiner—Yasin Barqadle

(57) ABSTRACT

A system and method where a Personal Address Book is created. The Personal Address Book has user information. A user sends a voice message requesting a connection. The system and method retrieves connection information from the Personal Address Book, said makes the connection based upon the information in the Personal Address Book. Entries in the Personal Address Book are marked as invited callers. The system and method virally extends the subscribing community by inviting these callers to become part of the subscribing community. The system and method also allows other services to be synchronized with the Personal Address Book.

7 Claims, 6 Drawing Sheets

| NAME | PHONE NUMBERS | | DETAILS |
|---|---|---|---|
| JOHN BAKER 408 | HOME | 312-555-1234 | |
| | WORK | 312-555-5678 | |
| | MOBILE | 312-555-9123 | ☒ COMMUNITY |
| | PAGER | 312-555-4321 | |
| | OTHER | 312-555-5432 | |
| MARY JONES 416 | HOME | 312-555-6543 | |
| | WORK | 312-555-7654 | ☐ COMMUNITY |
| | MOBILE | 312-555-8765 | |
| ROBERT MILLER 422 | HOME | 312-555-9876 | ☐ COMMUNITY |
| | WORK | 312-555-3456 | |
| ANNE SMITH 428 | HOME | 630-555-4567 | ☒ COMMUNITY |

FIG. 4

APPARATUS AND METHOD FOR PROVIDING SERVICES USING PERSONAL ADDRESS BOOKS

BACKGROUND OF THE INVENTION

1. Field of the Invention

The present invention relates to methods and systems using Personal Address Books (PABs) to provide services for telecommunication network users.

2. Description of Related Art

Modern telecommunication networks offer a wide variety of tools and services. The tools and services allow a user of these networks to store information concerning other users and to communicate with those other users. The tools and services include Personal. Address Books (PABs), call-following services, network-based speech recognition services, and e-mail, for instance.

A PAB may store information, such as names, addresses, telephone numbers, for instance, in a database for retrieval by the "owner" of the PAB. The PAB owner is typically the only user of the telecommunication network that can access and modify his or her PAB. The owner may be, for example, a person, an institution, a business, or any other entity. The PAB owner can often search his or her PAB for a name, phone number, or other information. Once the PAB owner obtains the desired information, the owner may use the information for a variety of purposes. For example, they may use the information to make a phone call to another user of the network.

call-following service may help establish a connection between a caller and a wireless device no matter where the wireless device is located in a network. For example, a caller from a fixed-location landline phone may wish to make a call to the wireless device. The wireless device can move anywhere within a wireless network. A call-following service automatically locates the wireless device and makes the connection between the caller (from the fixed-location landline phone) and the wireless device. The caller does not need to know the location of the wireless device. The caller also does not need to dial an access number. Instead, the caller only needs to dial the number of the wireless device, and the connection between the caller and the wireless device is automatically established by the call-following service.

A network-based speech recognition service is used by users to place calls by speaking phrases. For example, a user might say "Call John Smith," and the speech recognition service places a phone call to John Smith. Alternatively, a user might say "Dial 555-1234," which causes that telephone number to be dialed.

Conventional speech recognition services comprise modules to recognize speech phrases. They also contain a database where speech pattern information is stored. A voice recognition algorithm uses speech patterns and other parameters stored in the database to recognize voice messages. For example, speech patterns containing thousands of phrases spoken by a user are stored in the database. The phrases are the most common phrases encountered in any given language and constitute the phrases likely to be received from users of the speech recognition service.

Electronic mail (e-mail) is another well-known service that allows users of a telecommunication network to communicate with each other. For example, users of the network compose e-mail messages, which they send to other users. E-mail comprises a fast and reliable method to maintain communications with users across a network.

In addition to the tools and services mentioned above, users of a network can be grouped into "subscribing communities." A subscribing community comprises a group of users of the network. The membership of the subscribing community may be determined using several criteria. For example, the users in the subscribing community may be associated with a specific local exchange. A subscribing community may also comprise a group of users subscribing to a set of services offered by a service provider.

Special billing arrangements may be associated with members of the subscribing community. For example, if the subscribing community comprises callers associated with a particular local exchange, a member of the subscribing community may pay a fixed charge to make calls to other members of the subscribing community (who are associated with the same local exchange). Calls made to users outside the subscribing community (i.e., to destinations outside of the local exchange) may have an additional fee that is charged to the customer.

SUMMARY OF THE INVENTION

The present invention relates to a method and system whereby a Personal Address Book (PAB) may be used to provide or access various other services or tools for users of a network. The services or tools may include, for example, virally establishing a subscribing community and call-following. The PAB may also be used to link or synchronize services or tools.

In one embodiment of the invention, a subscribing community may be virally extended using a PAB. A first user, belonging to a subscribing community and subscribing to a PAB service, may create a Personal Address Book (PAB) on a network. The network may include a service node. The PAB may contain information indicating the other users of the network. The first user marks some or all of the other users in the PAB, signifying that the first user desires that the marked users join the subscribing community. The marked users are known as "invited guests." Using the list of invited guests in the PAB, the service node automatically generates invitations to the invited guests to join the subscribing community. Invited guests then accept or decline the invitations. If the guest accepts the invitation, the service node creates a temporary or community partner PAB. The service node then invites the guest to become a subscriber to the PAB service. When the guest becomes a subscriber, the service node creates a PAB for :the guest (now a subscriber). This process can be repeated, with the new subscriber marking invited guests in his or her PAB. In this manner, the subscribing community is virally extended.

In another embodiment of the invention, the PAB may be used for call-following using a Voice-Activated Dialing (VAD) service. A user requests to access a VAD service from a communication device. For example, the user (who is the owner of the PAB) may dial an access number. The request is received at a service node. In response to the request, the service node may play a prompt to the user and the user may speak a voice command into the communication device to dial a "destination." The destination may be specified in several ways. For example, the destination may be in the form of an actual number (555-1234), a person (John Smith), or a business (Smith's Bookstore). Next, the service node recognizes the nature of the voice command (i.e., the contents of the command). Then, the service node retrieves connection information in the PAB. The connection information is sufficient for the service node to make a connection between the user land the destination. For example, if the command is "Dial John Smith," the service node determines that the "destination" is a person (John Smith) and then retrieves the number of John Smith from the PAB. Finally, the service node makes the connection using the information contained in the PAB.

In another embodiment of the invention, information in the PAB may synchronized or linked together to perform a service. For example, if a PAB contains an entry for John Smith, the name (John Smith) and e-mail address for John Smith may be linked. If the owner of a PAB says "E-mail John Smith," then the service node recognizes the command (i.e., that it requests e-mail to be sent), determines the e-mail address of John Smith, and transmits an e-mail message to John Smith.

In another embodiment of the present invention, an electronic PAB is established and information in the PAB is used to provide services to users of a telecommunication network. The electronic PAB, which has an owner, is established by a service node. For example, the PAB may be created (if it does not exist) or retrieved from a memory (if it already exists). The electronic PAB contains connection information associated with users of the telecommunication network. For example, the connection information may include telephone numbers or e-mail addresses.

After receiving a request from the owner of the electronic PAB to perform a service, the service node accesses the electronic PAB, retrieves any needed information from the electronic PAB, and performs the user service using information retrieved from the electronic PAB. The service may be, for example, virally extending a subscribing community.

In another embodiment of the invention, a first PAB is used to virally extend a subscribing community. A first PAB is established by a service node. The first PAB has an owner. The owner belongs to a subscribing community. The first PAB may contain a plurality of entries. Each of the entries has associated connection information and an associated user. The connection information may include telephone numbers and e-mail addresses, for example.

A user selects entries in the PAB. The user-marked entries are associated users, which the owner wishes to join the subscribing community. The service node marks the selected entries. The service node sends an invitation to the associated users (of the marked entries) by utilizing the connection information in the entries. The service node receives acceptances from the associated users of the entries marked. In response to receiving each of the acceptances, the service node creates another PAB. The associated user (with the second PAB) can now mark entries in this newly-created PAB. In this way, the subscribing community can be virally extended.

In another embodiment of the present invention, a PAB is used to provide services to users of a telecommunication network. A service node receives a voice message from a user. The voice message requests that a connection be made to a destination number. The service node determines the content of the voice message. The service node retrieves the connection information from the user's PAB using the content of the voice message. The connection information is sufficient to establish a communicative connection between the user and the destination number. The service node makes the connection between the user and the destination number using the connection information.

In another embodiment-of the invention, the service node may contain a PAB services module, which is coupled to a Voice-Activated Dialing module. The Voice-Activated Dialing module receives voice messages from the owner of a PAB. The Voice-Activated Dialing module may determine the contents of the voice messages.

The PAB services module accesses the PAB and provides PAB services in response to the receipt of the voice messages. The services may include virally extending a subscribing community using the connection information in the PAB. The services may also include creating a PAB, making a communicative connection to the entries of the PAB, and sending e-mail to an addresses contained in the PAB.

The PAB may contain a plurality of entries and connection information. For example, the connection information may include telephone numbers and e-mail addresses.

These as well as other features and advantages of the present invention will become apparent to those of ordinary skill in the art by reading the following detailed description, with appropriate reference to the accompanying drawings.

BRIEF DESCRIPTION OF THE DRAWINGS

Exemplary embodiments of the present invention are described herein with reference to the drawings, in which:

FIG. 4 is a block diagram of a Personal Address Book (PAB) in accordance with an exemplary embodiment of the present invention;

DETAILED DESCRIPTION OF EXEMPLARY EMBODIMENTS

Figure 1:
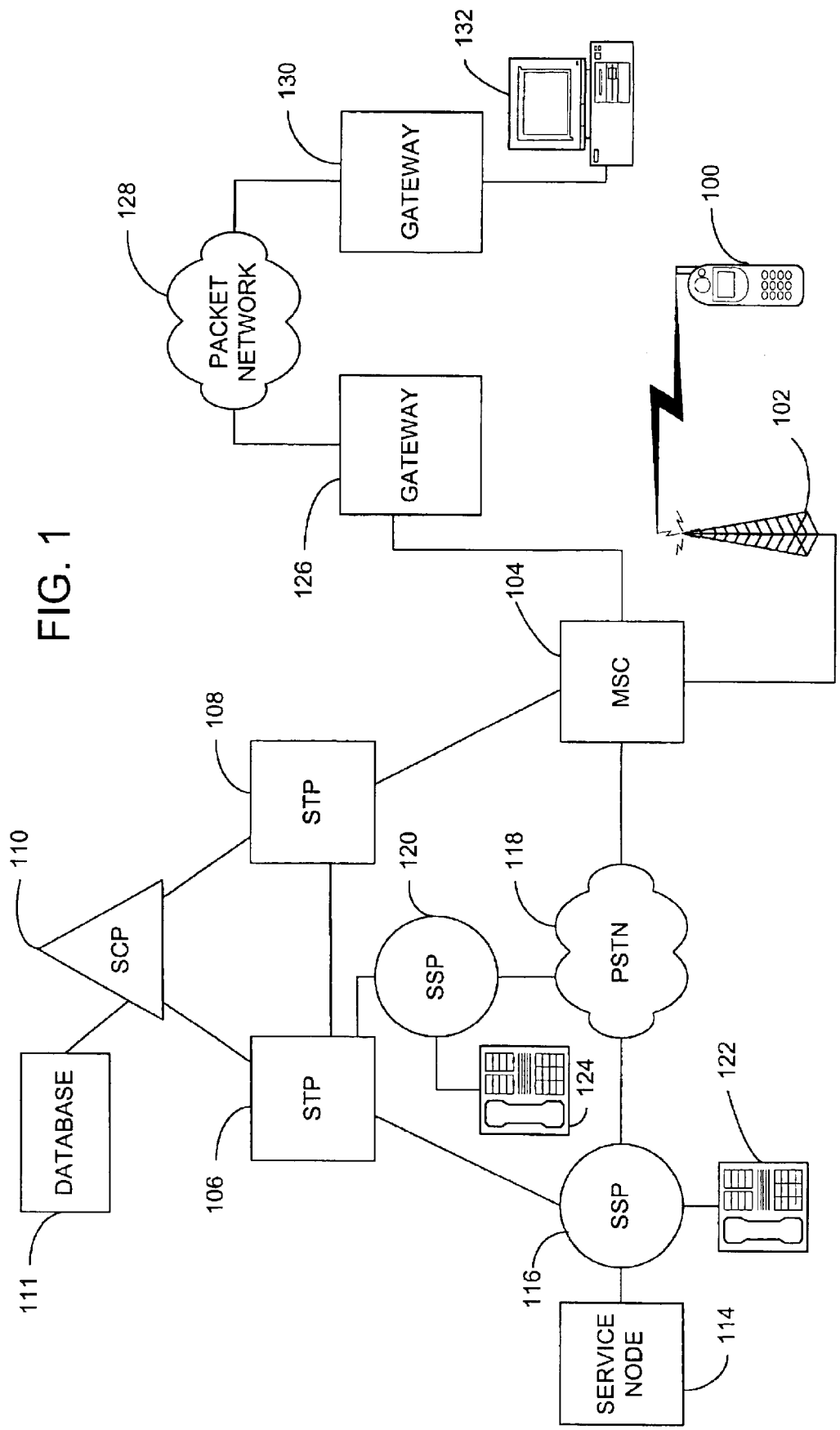
FIG. 1 is a block diagram of a communication network in accordance with an exemplary embodiment of the present invention.

Referring now to FIG. 1, one exemplary embodiment of the present invention is described. A wireless device 100 is coupled to a base station 102. The coupling is accomplished using an air interface. The base station 102 is coupled to a Mobile Switching Center (MSC) 104.

The MSC 104 is coupled to a first Service Transfer Point (STP) 108. The STP 108 is coupled to a Service Control Point (SCP) 110, a second STP 106, and a gateway 126. The SCP 110 is coupled to a database 111. The database 111 may contain a plurality of electronic Personal Address Books (PABs).

A Public Switched Telephone Network (PSTN) 118 is coupled to a first Service Switching Point (SSP) 116 and a second SSP 120. The first SSP 116 is coupled to a service node 114 and a first landline phone 122. The second SSP 120 is coupled to a second landline phone 124 and the second STP 106.

The MSC 104 is coupled to a gateway 126. The gateway 126 is coupled to a packet network 128. The packet network 128 is coupled to a gateway 130. The gateway 130 is coupled to a personal computer 132.

The wireless device 100 may be any type of wireless device employing any type of message transmission technology, for example, a cellular phone. The wireless device 100 may transmit and receive voice and/or data messages.

The base station 102 is any type of base station capable of transmitting and receiving wireless transmissions. Illustratively, the base station 102 is of the type manufactured by Motorola, Inc. of Schaumburg, Ill.

All communications to and from the wireless device 100 are routed through the MSC 104. The MSC 104 may also include control, authentication, and billing functions. However, some or all of these functions may be distributed between the base station 102 and the MSC 104. Illustratively, the MSC 104 is a Lucent or Nortel MSC.

The SSPs 116 and 120 and the MSC 104 are connected to each other and to the SCP by a signaling network that includes the STPs 106 and 108. The signaling network carries out-band signals that are used to control the STPs and MSC and to set up and tear down a circuit (in the PSTN 118) between a calling party and a called party. For example, Signaling System 7 (SS7) may be used as the signaling system. Of course, other signaling systems may be used.

The STP 106 and the STP 108 also provide routing functions. For example, the routing functions include relaying messages between the SSPs 116 and 120 and the SCP The SCP 110 contains control information and call processing logic to assist SSPs 116 and 120 in handling calls. For this purpose, the SCP 110 is programmed with logic that defines "trigger points," at which SSP 116 or 120 should seek guidance from SCP 110. At the trigger points, either the SSP 116 or the SSP 120 sends a query message to the SCP 110. Next, the SCP 110 returns a response message to the SSP 116 or 120. According to SS7, these query and response messages are known as Transaction Capabilities Application Part (TCAP) messages.

The SSP 116 may include a table that identifies a range of subscriber numbers associated with special services, and the SSP 116 may be programmed with a trigger that causes SSP 116 to query SCP 110 in response to a call origination attempt involving one of these numbers. At that trigger point, SSP 116 sends a TCAP query to the SCP 110 providing various parameters such as the calling number and the called number. In turn, SCP 110 executes service logic to determine what SSP 116 should do with the call, and the SCP 110 then sends a TCAP response back to the SSP 116. The TCAP response may instruct the SSP 116 to route the call to a particular destination or may provide various other instructions or information.

The landline phones 122 and 124 are phones that are coupled to the SSPs 116 and 120, respectively. Alternatively, other devices can be substituted for the landline phones. The other devices may be connected via gateways or to other networks. In addition, the other devices may include any device capable of transmitting or receiving voice and/or data communications.

The PSTN 118 is a switched network that provides a path by which phones or other telecommunication devices can be connected to each other. For example, the PSTN 118 provides a path by which the landline phone 122 can be connected to the landline phone 124. The PSTN 118 also provides a path by which the landline phones 122 and 124 can be connected to the wireless device 100.

The service node 114 provides services to users. For example, the service node 114 provides Voice-Activated Dialing (VAD) services, Personal Address Book (PAB) services, and e-mail services. Other types of services are possible. In addition, the service node may access other services provided at other locations.

The packet network 128 switches packets of information across a plurality of nodes (within the packet network 128). For example, the packet network 128 may be the Internet or an ATM network. Other types of packet networks are possible.

The gateway 126 converts voice and/or data transmissions handled by the MSC 104 into a packet sequence appropriate for transmission over the packet network 128. The gateway 130 routes packets from the packet network 128 to the personal computer 130.

The personal computer 130 allows a user to send and receive e-mail. Other functions are possible. In addition, the personal computer may be any type of device capable of sending and receiving data communications.

Of course, the system illustrated in FIG. 1 may be modified in any number of ways. For example, the SCP 110 may contain the database 111. Other modifications are possible.

One example of the operation of the system described in relation to FIG. 1 is as follows. A user from the landline phone 122, landline phone 124, or wireless device 100 activates a PAB service at the service node 114. Any other type of communication device may also be used to activate the PAB service. The user may dial a special telephone number to activate the PAB service at the service node 114. Once the PAB service is activated, the features and capabilities of the service are accessible to the user. For example, a flag may be set in the service node, which activates the service. Other types of activation are possible.

The PAB service may provide several features and capabilities for users of the service. For example, the PAB service may allow the user to create a PAB, add entries to an existing PAB, locate information in the PAB, extend a subscribing community using information in the PAB, place a telephone call using information in the PAB, and send messages to e-mail addresses contained in the PAB. Other services are possible.

Once the PAB service has been activated by the user or in any other way, the user may make a request to use a specific feature or capability of the PAB service. For example, the user may request to create a PAB, add entries to an existing PAB, locate information in the PAB, extend a subscribing community using information in the PAB, place a telephone call using information in the PAB, or send messages to e-mail addresses contained in the PAB. The service request may be in the form of a voice message containing a command. For example, the command in the voice message may be "Set John Smith as an invited guest" or "Call John Smith at work."

In addition to commands, the user may communicate other information to the service node 114. For example, the user may communicate information concerning entries to be added to the PAB, for example, names and e-mail addresses.

Upon activation, the service node 114 accesses the PAB. The PAB may have been recently created or the PAB may already exist and be stored in the database 111. If the PAB exists, then the PAB may be downloaded from the database to a temporary memory in the service node 114. If the PAB does not exist, then the service node 114 creates the PAB in a temporary memory in the service node 114. At the completion of the service request, the service node 114 stores the PAB in the database 111.

The service node 114 may provide the PAB service. For example, if the request is to mark an entry in the PAB, the entry in the PAB is marked (as a "invited caller"). The service node 114 then may send invitations (via e-mail) to the invited caller (at the e-mail address of the invited caller). If the invited caller accepts the invitation and the invited caller subscribes to the PAB service, the service node 114 may create a PAB for the invited caller.

In another example, if a user (the "calling party") requests the service node to call a person (the "called party") by name, the service node 114 may use the PAB to determine the number to call. After the number has been determined by the service node 114, the connection between the calling party and the called party is made. Other types of PAB services are possible.

Figure 2:
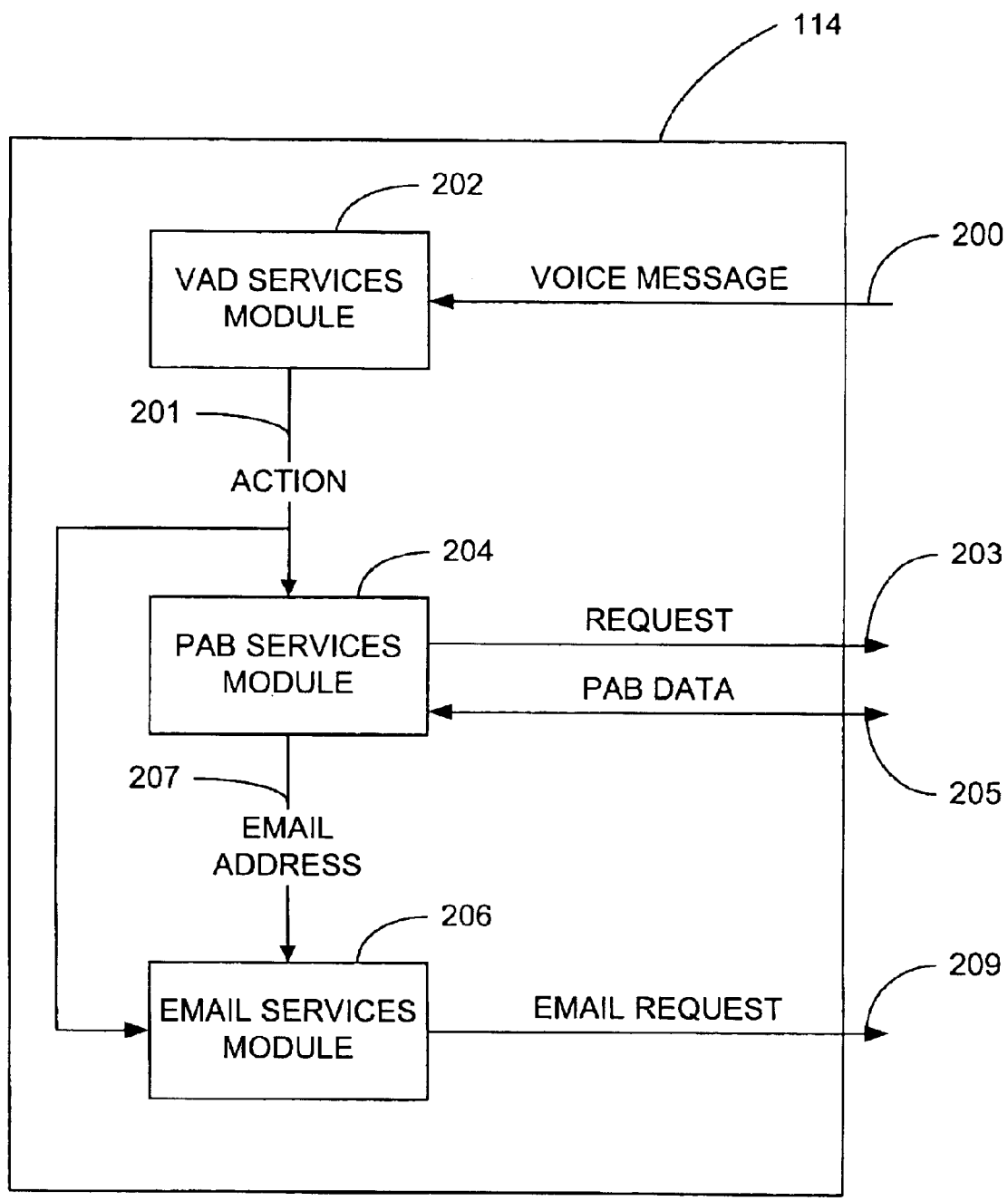
FIG. 2 is a block diagram of the service node in accordance with an exemplary embodiment of the present invention.

Referring now to FIG. 2, the service node 114 is described. The service node 114 may include a VAD services module 202, a PAB services module 204, and an e-mail services module 206. Other modules that provide or access other services are possible.

The VAD services module 202 provides VAD services at the service node 114. For example, the VAD services may include voice recognition. Other VAD services are possible. The VAD services module 202 receives a voice message over a voice message lead 200. The lead originates from the SSP 116.

The voice message may include a user-specified request. For example, the user-specified request may be to access, modify, or create a PAB. In another example, the user-specified request may be a request to send an e-mail. Of course, other types of requests are possible.

The VAD services module 202 receives the voice message over the voice message lead 200, recognizes the contents of the message, and identifies the action (or actions) to be performed in order to satisfy the request in the voice message. For example, if the voice message is "Call John Smith," the VAD services module 202 receives the message and recognizes that the message is a request to call John Smith. The VAD services module 202 determines the appropriate action requested by the voice message. In this case, the PAB may be accessed and the telephone number for John Smith determined (from information in the PAB). The VAD services module 202 may perform other functions, as well.

The action determined by the VAD services module 202 may be communicated via action lead 201 to the PAB services module 204 and to the e-mail services module 206. The PAB services module 204 receives the action over the action lead 201 and performs the action specified via the action lead 201. For example, if the action specified via the action lead 201 is to access a PAB, the PAB services module 204 requests that the PAB be retrieved from a database, for example, database 111 in FIG. 1, via a request lead 203. The retrieved PAB from the database is input to the PAB services module 204 over a PAB data lead 205. Once the PAB services module 204 receives the PAB, the VAD services module 202 can access information from the PAB. If the PAB is modified by the PAB services module 204, then the PAB may be returned via a PAB data lead 205 to the database.

The PAB services module 204 also determines e-mail addresses from information in the PAB. For example, e-mail addresses may be needed when the service node invites other users to become part of a subscribing community. In addition, an e-mail address may be needed when a user requests that e-mail be sent to a person listed in a PAB. In any situation where an e-mail address may need to be determined, the PAB services module 206 may determine the e-mail address, and may communicate the e-mail address to the e-mail services module 206 via e-mail address lead 207. The PAB services module 204 may perform other functions in addition to those described above.

The e-mail services module 206 may receive a request to create an e-mail via action lead 201 and the e-mail address via e-mail address lead 207. The e-mail services module 206 then generates the e-mail and the e-mail is sent over e-mail request lead 209 to the network. The network, using the e-mail address, then routes the e-mail to the correct destination.

Figure 3:
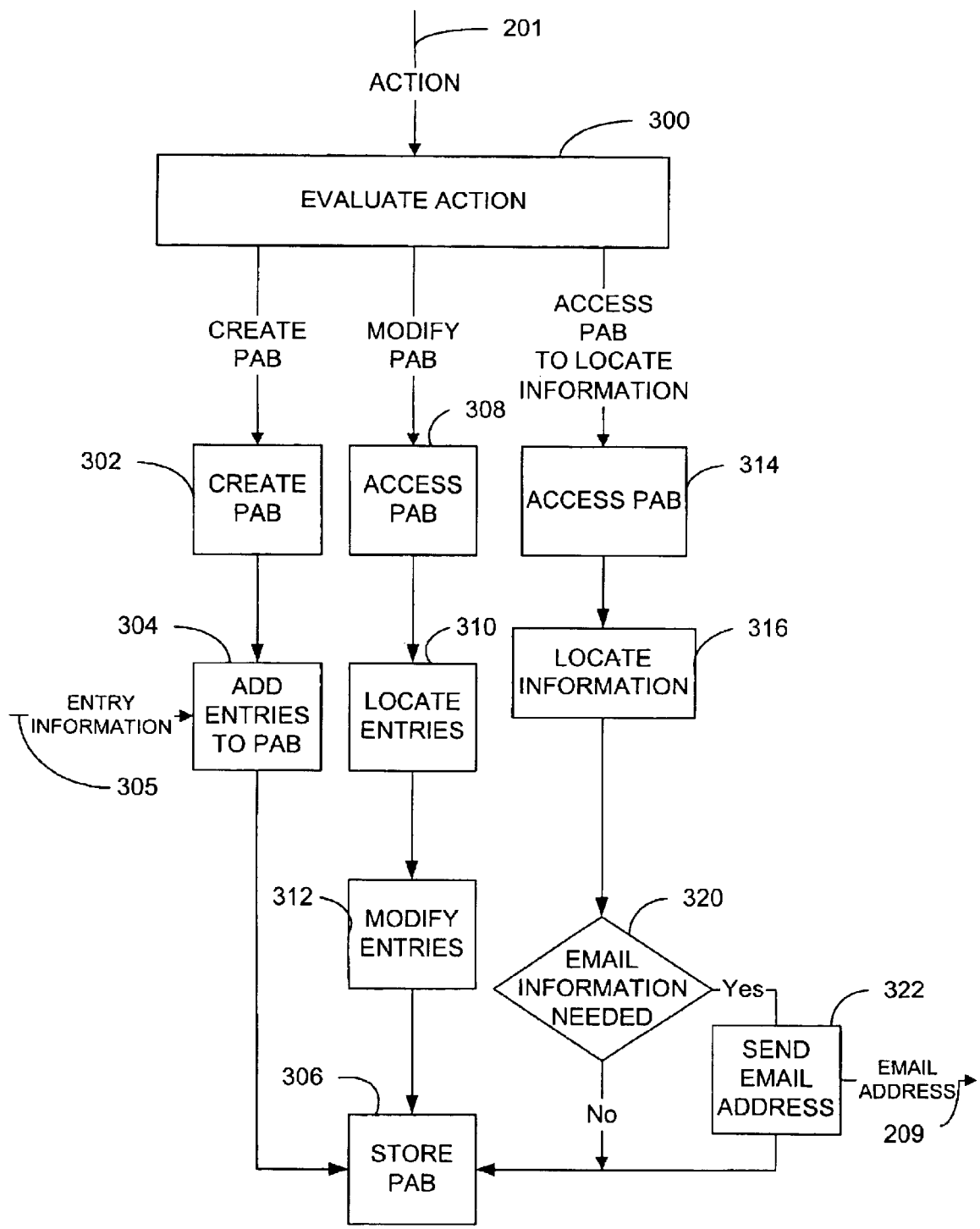
FIG. 3 is a flowchart of the operation of the service node in accordance with an exemplary embodiment of the present invention.

Referring now to FIG. 3, the operation of the PAB services module 204 is described. At step 300, the services module evaluates an action received over the action lead 201. The action may be to create a PAB, modify a PAB, or access a PAB. The action lead 201 may also communicate other information, for example, information identifying the particular PAB to be accessed. In addition, the action lead may communicate information identifying an entry within the PAB. Of course, other actions and other types of information are possible.

If the action is to create a PAB, at step 302, the PAB services module creates a PAB. The PAB is created in a temporary memory in the PAB services module. At step 304, the PAB services module adds the entries requested to the PAB. Entry information is input over a entry information lead 305. The lead 305 originates from the VAD services module 202.

If the action is to modify an existing PAB entry, at step 308, the PAB services module accesses the PAB (of the user) and the PAB is retrieved. For example, the PAB may be removed from the database 111. Or, if the PAB resides locally in the service node, the PAB is retrieved from the memory in the service node.

Next, at step 310, the PAB services module locates the entry in the PAB. For example, if the entry corresponds to a name, the PAB entry relating to that name is located. Then, at step 312, the PAB services module modifies the entry with information received via the action lead 201.

At step 306, the PAB is returned to storage. If the PAB has been retrieved from the network, then it is re-stored on the network (e.g., at database 111). If the PAB has been retrieved locally from the service node, then the PAB is re-stored locally at the service node.

If the action is to access an existing PAB in order to locate (but not modify) information, at step 314, the PAB is retrieved. For example, the PAB may be removed from the database 111. Or, if the PAB resides locally in the service node, the PAB is retrieved from the memory in the local service node. Next, at step 316, the service node locates the requested information in the PAB. For example, if the action specifies that a person be contacted, the PAB entry relating to that person is located.

At step 320, the PAB services module determines whether e-mail information may be needed. If the answer is affirmative, at step 320 the PAB services module may send the e-mail address over lead 209 to the e-mail services module 206. Control then continues at step 306. If the answer at step 320 is negative, control continues at step 306. At step 306, the PAB is stored again. For example, if the PAB has been retrieved from the database 111, then it is re-stored in the database 111. If the PAB has been retrieved locally from the service node, then the PAB is re-stored locally at the service node.

Referring now to FIG. 4, an exemplary Personal Address Book 400 (PAB) is described. The PAB 400 may comprise a name column 402, a phone number column 404, and a further details column 406. As shown, the exemplary PAB 400 comprises four rows 401*a*, 401*b*, 401*c*, and 401*d*. Each row 401*a*, 401*b*, 401*c*, and 401*d* represents information about a certain user.

The first row 401a of the PAB 400 has an associated name entry 408. The user associated with the entry 408 is "John Baker." Corresponding to the user John Baker is a phone number entry 410. The phone number entry 410 has phone numbers for home, work, mobile, pager and an "other" location. Corresponding to the user John Baker is a details entry 414. In this case, the details entry has a community box. The community box is checked if the owner of the PAB desires that John Baker be contacted to become a member of the subscribing community. In this case, the community box has been checked indicating that the owner of the PAB desires that John Baker be contacted to see if John Baker desires to become a member of the subscribing community.

The second row 401b has an associated name entry 416. The user associated with the entry 146 is "Mary Jones." Corresponding to the user Mary Jones is a phone number entry 418. The phone number entry 418 has phone numbers for home and work, as well as a mobile number. Corresponding to the user Mary Jones is a details entry 420. In this case, the details entry has a community box. The community box is checked if the owner of the PAB desires that Mary Jones be contacted to become a member of the subscribing community. In this case, the community box has not been checked indicating that the owner of the PAB does not desire that Mary Jones be contacted to see if Mary Jones desires to become a member of the subscribing community.

The third row 401c has an associated name entry 422. The user associated with the entry 422 is "Robert Miller." Corresponding to the user Robert Miller is a phone number entry 424. The phone number entry 424 has phone numbers for home and work. Corresponding to the user Robert Miller is a details entry 426. In this case, the details entry has a community box. The community box is checked if the owner of the PAB desires that Robert Miller be contacted to become a member of the subscribing community. In this case, the community box has not been checked indicating that the owner of the PAB does not desire that Robert Miller be contacted to see if Robert Miller desires to become a member of the subscribing community.

The fourth row 401d has an associated name entry 428. The user associated with the entry 428 is "Anne Smith." Corresponding to the user Anne Smith is a phone number entry 430. The phone number entry 430 has a home phone number. Corresponding to the user Anne Smith is a details entry 432. In this case, the details entry has a community box. The community box is checked if the owner of the PAB desires that Anne Smith be contacted to become a member of the subscribing community. In this case, the community box has been checked indicating that the owner of the PAB desires that Anne Smith be contacted to see if Anne Smith desires to become a member of the subscribing community.

The PAB may include other entries. For example, the PAB may include messaging screen names and e-mail addresses. In addition, other buttons could exists in the PAB. These buttons could include a screen button. The screen button may reject calls having a certain number or other information. A pass button may be included, which passes calls having a certain number or other information. Other types of entries providing additional information are possible.

Figure 5:
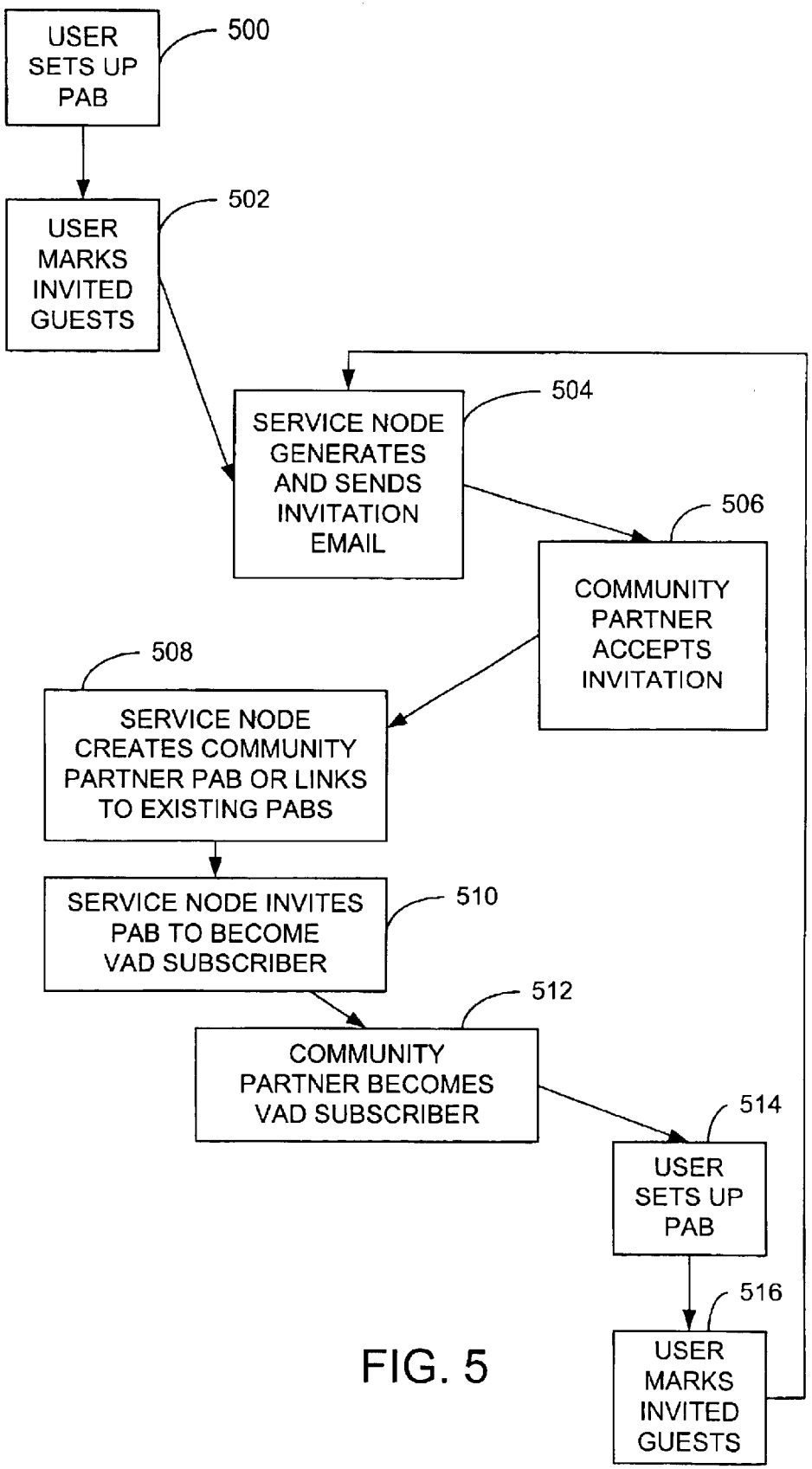
FIG. 5 is a flowchart of the operation of the service node in accordance with an exemplary embodiment of the present invention.

Referring to FIG. 5, the operation of the service node is described in relation to creating a PAB and virally extending a subscribing community. The service node provides PAB services that are offered to users of a network on a subscription basis.

At step 500, a user (who may be a subscriber to a PAB service provided by a service node) creates a PAB. The user sends a request to the service node to create the PAB and the service node creates the PAB. The user becomes the owner of the PAB. The PAB can be stored in the service node or elsewhere on the network.

The PAB comprises entries. The entries comprise names and telephone numbers, e-mail addresses, and other information associated with a name. In addition, the entries may contain a place to mark the name as "invited." For example, the place may be a field in a database record. If the name is marked as invited, the service node invites that person to join the subscribing community. Of course, other types of information may be included in the entries.

After the service node creates the PAB, the user communicates information to the service node, which fills the PAB entries. For example, the user may communicate the information using a telephone. Alternatively, the user may utilize a personal computer or similar device. If the PAB has already been created, then step 500 can be omitted.

Next, at step 502, the owner of the PAB marks names ("invited callers") in the PAB that the owner of the PAB wishes to invite to join the subscribing community. At step 504, the service node generates and sends an invitation e-mail to be sent to each invited caller.

At step 506, the invited caller accepts the invitation. The acceptance of the invitation is communicated to the service node. At step 508, a community partner PAB is created at, the service node in temporary memory for the invited caller. The purpose of the community partner PAB is to temporarily store information relating to the invited caller. The community partner PAB may also have special properties or features. For example, the "owner" of the PAB may be able to access but not modify the contents of the community partner PAB. Other properties and features are possible.

At step 510, the service node sends an e-mail invitation to the invited caller to become a subscriber to the PAB service. Subscribing to the PAB service allows the invited caller to create and access a PAB, and to extend the subscribing community. At step 512, the invited caller becomes a subscriber to the PAB service. For example, the invited caller may call a special telephone number to activate the PAB service. At step 514, the service node creates a PAB for the invited caller. At step 516 the invited caller, now a subscriber marks entries in his or her PAB as invited callers. Control then returns to step 504 and execution continues as described above.

Figure 6:
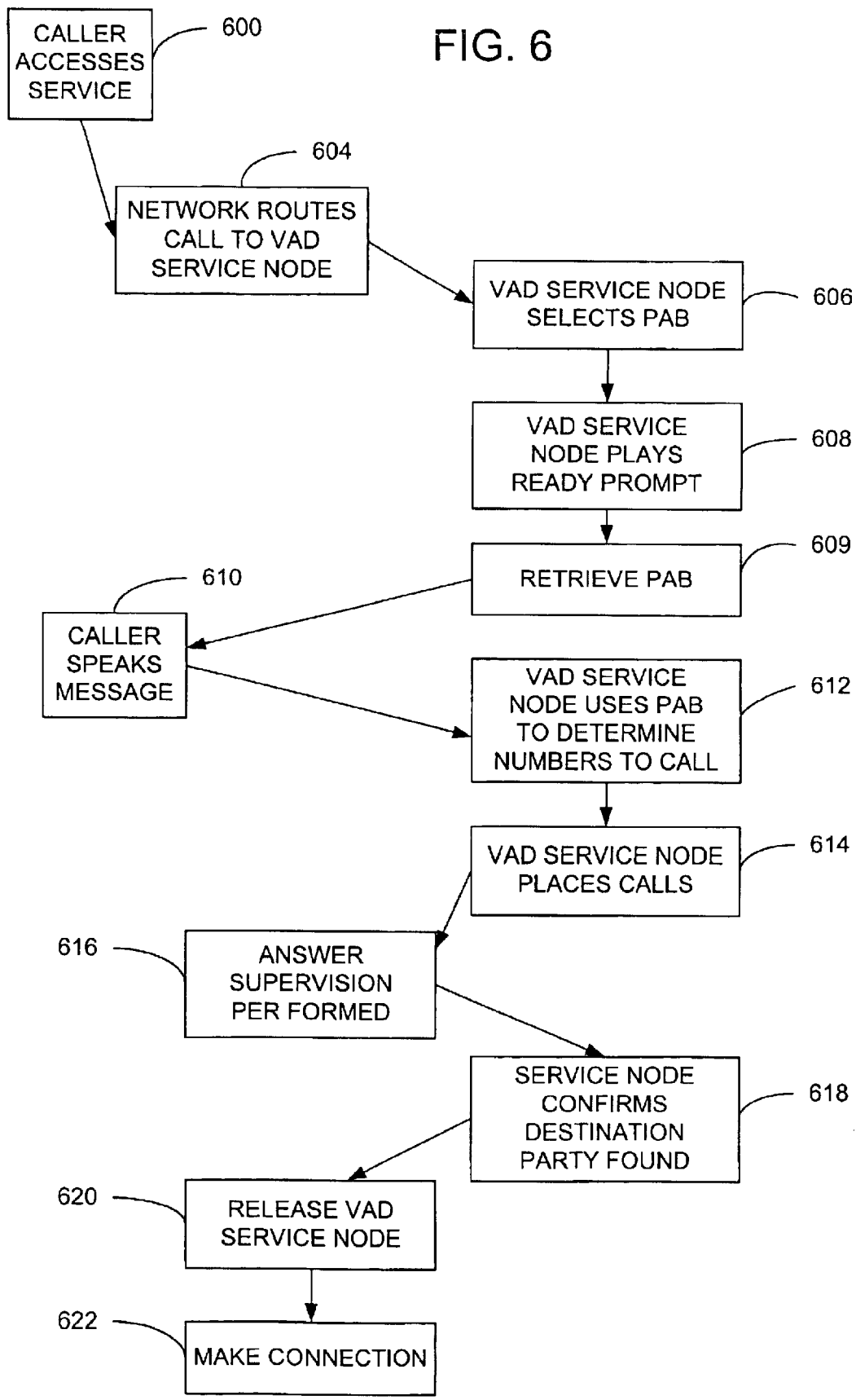
FIG. 6 is a flowchart of the operation of the service node in accordance with an exemplary embodiment of the present invention.

Referring to FIG. 6, another example of the operation of the service node is described. At step 600, a user activates a PAB service at a service node. For example, the user may activate the PAB service by dialing a telephone number. The user and service node are coupled together via a network.

At step 604, the network routes the call from the user requesting that the PAB service be activated to the service node. The PAB service is activated. For example, the service node may determine that the user is a subscriber to the PAB service and a flag may be set at the service node indicating that the service is activated.

Since multiple PABs may exist, at step 606, the service node selects the PAB owned by the user. For example, PABs may be indexed using ANI information (i.e., the telephone number of the user). The call may contain ANI information of the user and the service node may use the ANI information as an index to select the PAB.

At step 608, the service node plays a ready prompt to the user. For example, the prompt may be "Please speak your message now." This prompt is routed back, through the network, to the user. For example, if the user is calling from a cellular telephone, the prompt is played back to the user at the cellular telephone.

At step 609, the user's PAB is retrieved from a database. At step 610, the user ("the calling party") speaks a message requesting that a connection between the user and another person ("the called party") be established. The message may be a request to call a phone number, a person, or a person at a particular location. The message may also request that a person listed in the PAB be sent an e-mail. Other types of messages are possible.

The service node uses Voice-Activated Dialing (VAD) logic to determine the content 6f the message from the user. The service node then determines the action or actions to take (based upon the content of the message).

At :step 612, the service node uses the PAB to determine the information needed to complete the connection. For example, if the message from the user specifies a person to call, the service node locates the person's name in the PAB and the telephone number associated with that person in the PAB.

At step 614, the service node places the call from the calling party to the called party. At step 616, answer supervision is activated elsewhere in the network to supervise the call between the calling party and the called party. The answer supervision may, for example, maintain the time of the call for billing purposes. In addition, call screening (refusing to connect certain incoming numbers), call passing (connecting certain incoming numbers), or sequentially or simultaneously dialing a set of numbers in the PAB (to find a name) are all possible. Other functions are possible, as well.

At step 618, the service node confirms that the calling party and the called party have been found. At step 620, the service node is released from the call. For example, connections between the calling party and the service node are released. At step 622, the network makes the connection between the calling party and the called party.

As in most telecommunications applications, those skilled in the art will appreciate that many of the elements described herein are functional entities that may be implemented as discrete components, in any suitable combination and location. Further, various functions described herein as being performed by one or more entities may be carried out by a processor executing an appropriate set of machine language instructions stored in: memory. Provided with the present disclosure, those skilled in the art can readily prepare appropriate computer instructions to perform such functions. It will also be understood, that changes and modifications to the exemplary embodiments of the present invention described herein may be made without deviating from the spirit and scope of the invention, as defined by the following claims.

I claim:

1. A method for extending a subscribing community and providing user services using a Personal Address Book, said method comprising the steps of:

establishing a first Personal Address Book, said first Personal Address Book containing a plurality of entries, each of said entries having associated connection information and an associated user;

marking selected ones of said plurality of entries;

sending an invitation to said associated users of said entries marked in said marking step by utilizing said connection information in said entries marked in said marking step; and receiving acceptances from the associated users of selected ones of said entries marked in said marking step and, in response to receiving each of said acceptances, creating a second Personal Address Book for the user who provided the acceptance.

2. The method of claim 1, further comprising:

receiving a voice message from a user, said voice message requesting a connection to a destination number;

determining the content of said voice message;

retrieving said connection information from said first Personal Address Book based upon said content of said voice message, wherein said connection information is sufficient to establish a communicative connection between said user and said destination number; and making said connection between said user and said destination number using said connection information.

3. The method of claim 1 wherein said step of establishing said first Personal Address Book includes creating a new Personal Address Book.

4. The method of claim 3, further comprising the step of filling said entries of said first Personal Address Book with information.

5. The method of claim 3, further comprising the step of creating a linkage to a plurality of services, wherein said services include e-mail.

6. A service node in a telecommunications network comprising:

access means for accessing a Personal Address Book, said Personal Address Book containing a plurality of callers;

selection means, coupled to said access means, for selecting callers in said Personal Address Book as invited callers;

contact means, coupled to said selection means, for contacting said invited callers and asking said invited callers to join a subscribing community;

reception means for receiving an acceptance from each of said invited callers; and creation means, coupled to said reception means, for creating a plurality of second Personal Address Books in response to receiving said acceptances from said invited callers, wherein one second Personal Address Book is created respectively for each invited caller who provided an acceptance.

7. A computer program at a service node comprising:

first code for accessing a Personal Address Book, said Personal Address Book containing a plurality of callers;

second code for selecting callers in said Personal Address Book as invited callers;

third code for contacting said invited callers and asking said invited callers to join a subscribing community;

fourth code for receiving an acceptance from each of said invited callers; and fifth code for creating a plurality of second Personal Address Books in response to receiving said acceptances from said invited callers, wherein one second Personal Address Book is created respectively for each invited caller who provided an acceptance.

* * * * *